US008126812B1

(12) United States Patent
Peterson et al.

(10) Patent No.: US 8,126,812 B1
(45) Date of Patent: Feb. 28, 2012

(54) DIGITAL CONTENT VENDING, DELIVERY, AND MAINTENANCE SYSTEM

(75) Inventors: Harold L. Peterson, Los Gatos, CA (US); James B. Williams, Santa Cruz, CA (US)

(73) Assignee: Digital Delivery Networks, Inc., Scotts Valley, CA (US)

( * ) Notice: Subject to any disclaimer, the term of this patent is extended or adjusted under 35 U.S.C. 154(b) by 1014 days.

(21) Appl. No.: 09/423,025

(22) PCT Filed: Sep. 11, 1998

(86) PCT No.: PCT/US98/18948

§ 371 (c)(1), (2), (4) Date: Oct. 28, 1999

(87) PCT Pub. No.: WO99/13398

PCT Pub. Date: Mar. 18, 1999

Related U.S. Application Data

(60) Provisional application No. 60/058,623, filed on Sep. 11, 1997.

(51) Int. Cl.
*G06F 21/00* (2006.01)

(52) U.S. Cl. .............. 705/59; 705/50; 705/51; 713/189; 725/25; 725/30; 725/31; 726/27; 726/30; 726/31

(58) Field of Classification Search .......... 705/1, 50–53, 705/22–28; 380/4, 9, 21
See application file for complete search history.

(56) References Cited

U.S. PATENT DOCUMENTS 4,658,093 A * 4/1987 Hellman ......................... 380/25
5,457,746 A * 10/1995 Dolphin ............................ 380/4
5,646,992 A * 7/1997 Subler et al. ...................... 380/4
5,710,887 A * 1/1998 Chelliah et al. ............... 395/226
5,745,681 A * 4/1998 Levine et al. .............. 395/200.3
5,757,917 A 5/1998 Rose et al.
5,758,327 A 5/1998 Gardner et al.
5,809,144 A 9/1998 Sirbu et al.
5,984,508 A * 11/1999 Hurley .......................... 700/237

OTHER PUBLICATIONS

Goradia, Vaishali, "NetBill 1994 Prototype", Carnegie Mellon University Information Networking Institute, for the Degree in Master of Science in Information Networking.

* cited by examiner

*Primary Examiner* — Mamon Obeid
(74) *Attorney, Agent, or Firm* — Patent Venture Group; Raymond E. Roberts

(57) ABSTRACT

A digital content vending machine, DCVM (10), in which a client (12) on a personal computer, PC (14), contains an infrastructure (16) and an inventory (18). The infrastructure (16) and inventory (18) may both be stored in a hard drive (20), or the inventory (18) may instead be stored on a removable media (24), such as a CD (16), DVD (28), or tape (30). The infrastructure (16) presents a graphical user interface on the client (12) which metaphorically resembles a village (46) containing a plurality of stores (44) operated by vendors (42). Customers (40) shop in the stores (44) by selecting assets (22), constituting the inventory (18), and sending money (52) and an identifier (54) to a clearing house (50) via a communications system such as telephone (118), private network (120), or the Internet (122). The clearing house (50) returns a key (58) used to at least partially remove a digital wrapper (60) protecting the asset (22) from unauthorized use. A master server (48) may also be provided to update the infrastructure (16) and inventory (18), and to provide additional keys (58) used to remove the digital wrappers (60).

3 Claims, 12 Drawing Sheets

FIG. 2a
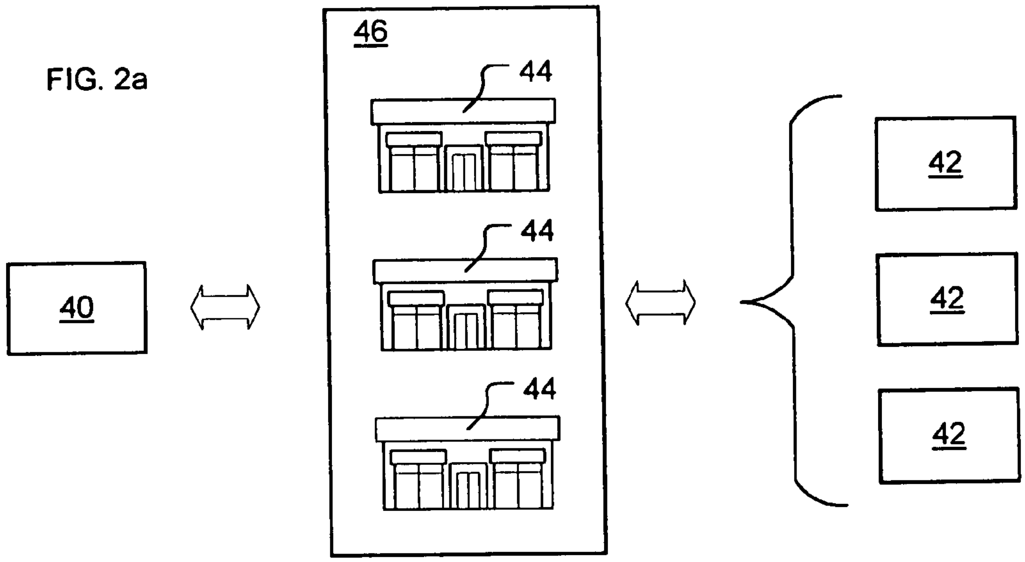
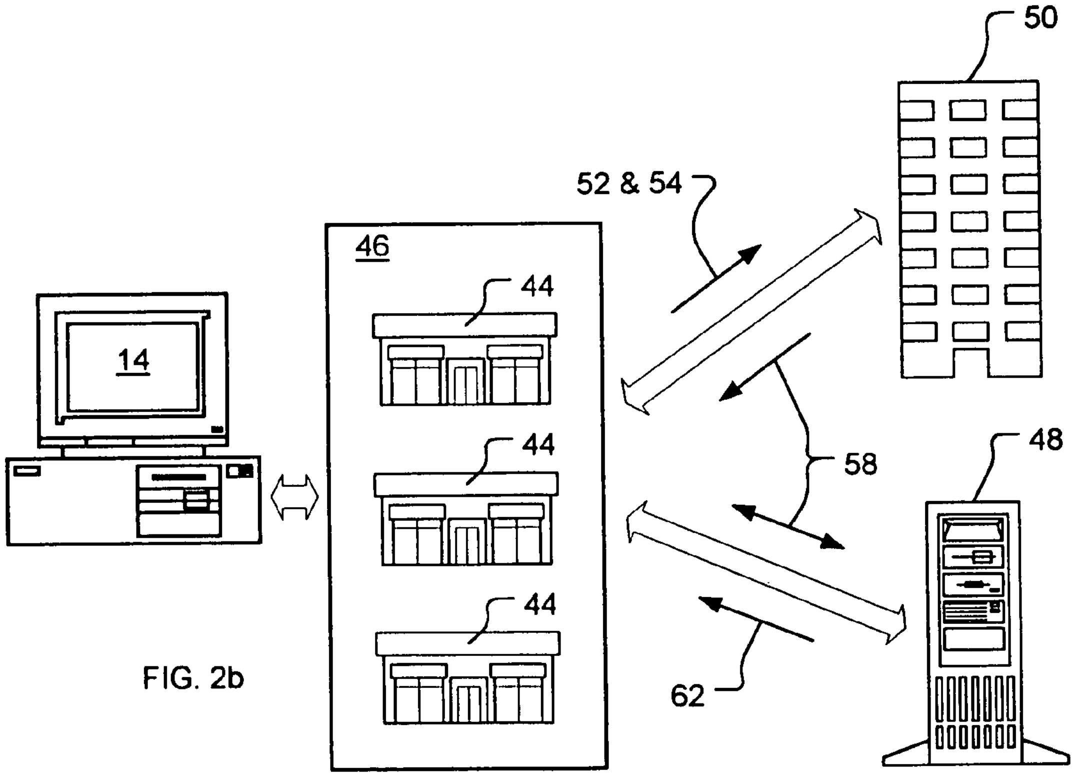
FIG. 2b

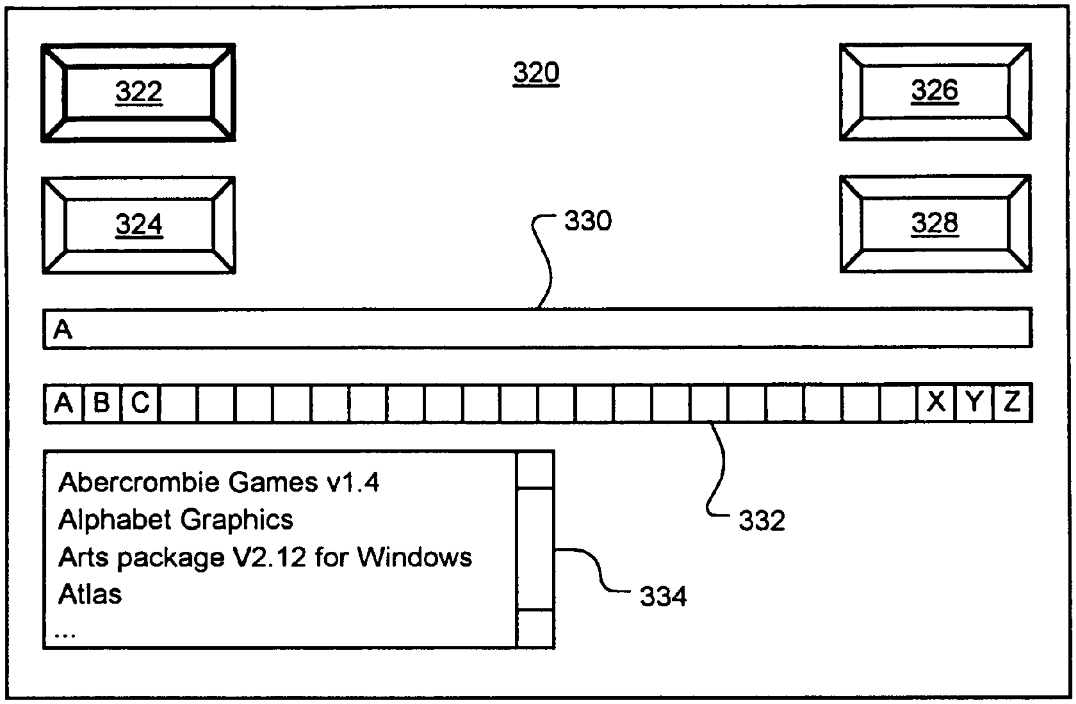
FIG. 10a
FIG. 10b
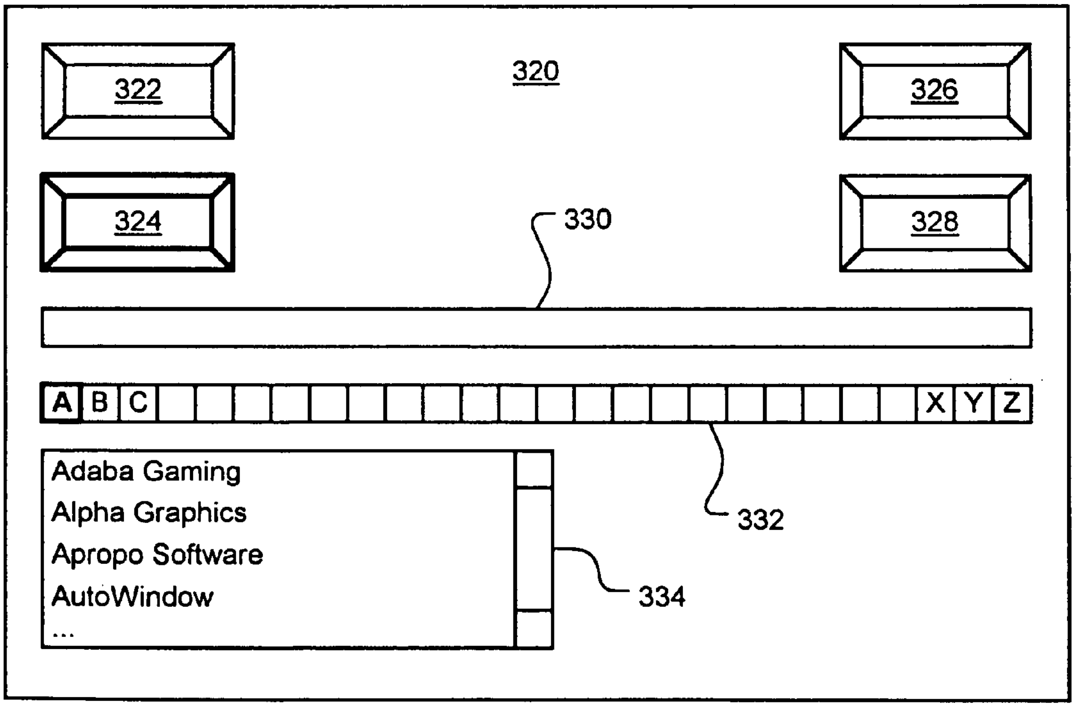

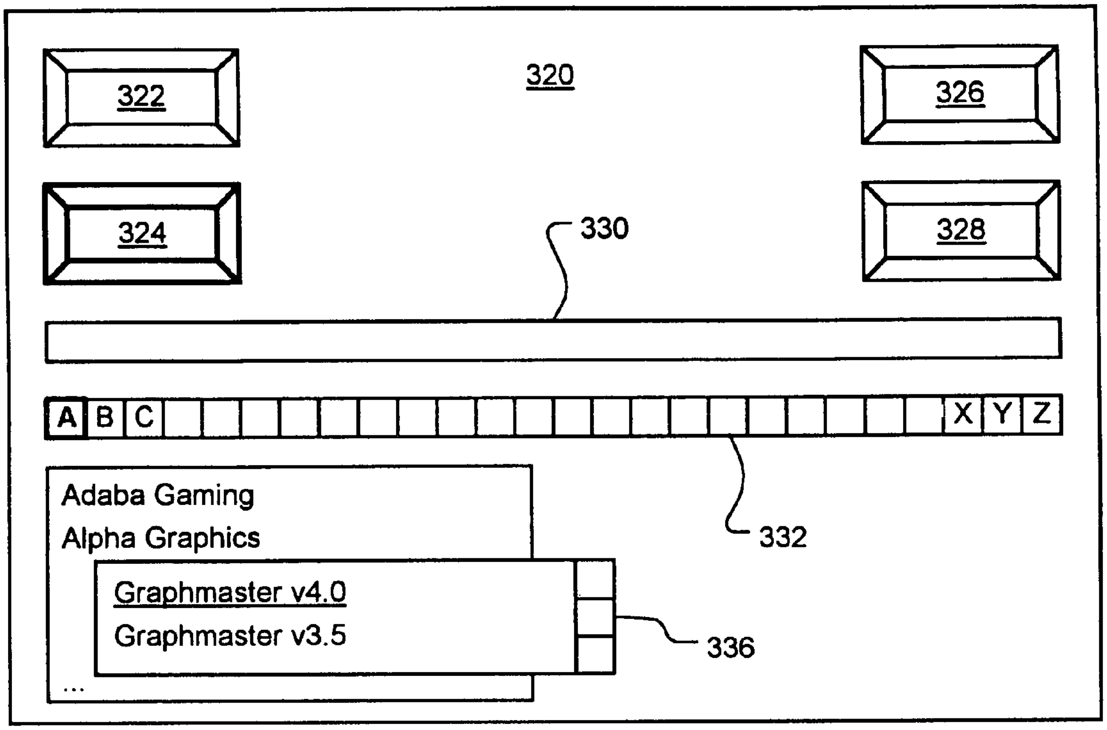
FIG. 10c
FIG. 10d
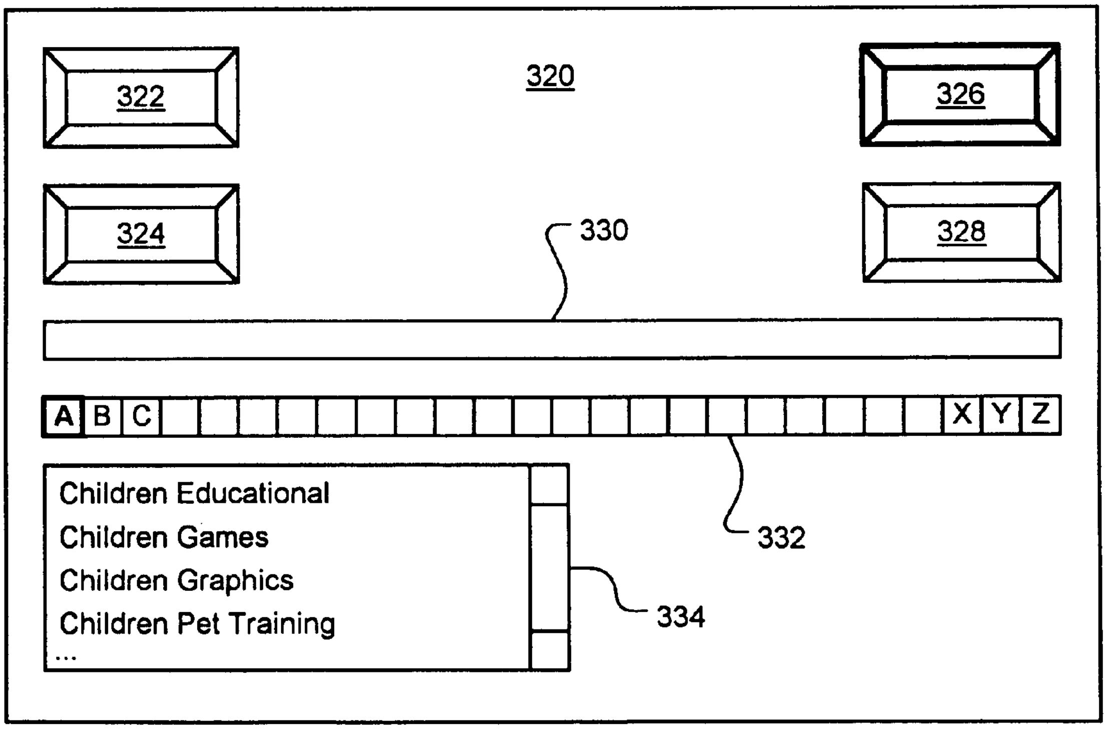

DIGITAL CONTENT VENDING, DELIVERY, AND MAINTENANCE SYSTEM

This application claims benefit of U.S. provisional application Ser. No. 60/058,623, filed Sep. 11, 1997.

TECHNICAL FIELD

The present invention relates generally to the marketing functions of vending and delivery of digital content and services related thereto, and more particularly to interactive computer network systems for such marketing.

BACKGROUND ART

Today we are seeing a merging of many products and services into digital formats. Some typical examples of such digital products are computer software; audio content, like music or audio-books; and audio-visual content, like videos and movies. For present purposes, the salient feature of such digital products is that they can often be treated as mere bags-of-bits (BOB's), with the underlying nature of the products ignored during most handling after creation and before use.

Somewhat less widely appreciated is that many services are now also digital to a considerable extent. For example, computer users today let applets run tests and communicate the results to providers for obtaining installation, upgrade, and problem diagnosis of operating system and applications software; computer game players send each other hints via e-mail; and Internet "telephone" and "radio" are emerging as replacements for specialized telephone and broadcast systems. Thus, often to a considerable extent services today can be reduced to digital communications, and can then also be treated as BOB's, in a somewhat more dynamic sense.

For more stable forms of such digital content, such as the products noted above, it has long been appreciated that the particular storage media used has become largely irrelevant. Tape, disk, and drum media are all common, as are physical, magnetic, and optical means of impressing digital content into them. Similarly, for digital services the channels of communication used have similarly become largely irrelevant. Electrical current through wires, light through fibers, and radiation through space are all common, and substantially interchangeable communications channels.

Of relatively recent advent are communications networks, particularly including public networks like the Internet. Although access to such networks is still far from universal, such networks are increasing the trend towards the irrelevance of the underlying media used to store digital products and the medium used to communicate digital services. Accordingly, in the following discussion the collective term "digital content" is used.

Because networks are overwhelmingly computerized, and thus those most familiar already with computers can be expected to most easily appreciate and readily adopt network storage and delivery of digital content, examples in the context of personal computers will be primarily used (personal computer: "PC"; used here in the broad sense, because even most computers in business today are actually termed PC's). It should, however, at all times also be appreciated that the principles being discussed are valid for and extendable to other contexts.

Turning now to an example of how the potential of digital content is not adequately being employed, new PC's today are usually purchased with some specific task in mind, such as word-processing. However, often the customer also wants to try out new PC hardware and software capabilities, much like the child in us all likes to immediately play with a new toy. Further, when a consumer purchases a new PC he or she usually also wants to employ it for such intended and experimental tasks almost immediately. It thus is not surprising that studies show that new PC owners are twice as likely to purchase software, as compared to ones who have owned their computers for longer than three months.

Various vehicles for delivery of software for new PC's exist. For example, it can be obtained at the same time as a new PC, or by returning to the store for later purchase. Further, obtaining the software at the same time as the PC can be achieved as a collateral purchase, or it can be obtained as "bundled" software coming with the PC. Unfortunately, there are a number of problems with these methods of delivery.

The collateral purchase of software usually occurs only when the consumer knows exactly what he or she wants, or when the price is within the consumer's impulse purchase price range (i.e., relatively low in price). There are various reasons for this, but some typical ones include the divide and conquer approach to getting a complex system working (including even so-called turn-key PC's today), and the palatability of separating hardware and software costs (which are substantial, particularly together).

In theory, the bundled approach to software delivery seems quite desirable. The consumer gets pre-installed working software, and economy of scale keeps the price for this low. Unfortunately, theory and reality do not mesh well here, and the desire of PC manufacturers today is to reduce the amount of bundled software. In surveys the reasons cited for this include cost (approx. $20 per system; which is substantial in the low margin competitive field of hardware sales), lack of quality in the software offerings (so-called "shovelware"), and general customer dissatisfaction. In fact, one top-ten PC manufacturer has found that over 20% of its customer survey respondents sent their PC's back because the bundled software "didn't work."

Thus, later purchase of software (i.e., post initial PC sale) remains the overwhelming means by which consumers today obtain software for their PC's, but even this approach has problems which are legend. Obviously there is the awkwardness of a second purchase, or purchases, with the attendant issues of what is now current, where it is in stock, and whether the stores are open. There are also heightened compatibility problems, since the consumer is now back in the store and the PC is now at home or in the office. And there are customer service issues. Even if the consumer returns to the very same store where he or she bought the PC, and perhaps even the very same clerk, he or she is now treated as if the present software purchase is the total extent of the commercial relationship.

However, as noted above, there are emerging new trends in marketing itself. Computer software is one of the leading commodities which has become digital content. For example, less than 2% of all software sales were recorded in electronic distribution channels in 1996, but that figure is expected to increase rapidly. Studies now show that ⅓ of software publishers expect ½ of their sales volume to be delivered electronically within the next 12-18 months.

Unfortunately, today electronic distribution of computer software remains merely another form of "later purchase" of software. It does nothing about, and in some cases even exacerbates, the existing technical issues of installation, configuration, and compatibility. And it introduces a plethora of new commercial issues, such as consumer trust in the mechanisms used for transactions, protections for the intellectual property in manufacturer's software products, and legal mechanisms to address breakdowns in these.

Accordingly, from the above it follows that what is today needed is a new mechanism for the marketing of computer software and services. And, by implication, as additional forms of digital content become common as well, such new marketing mechanisms should be extendable to them as well.

DISCLOSURE OF INVENTION

Accordingly, it is an object of the present invention to provide a new mechanism for the marketing of digital content.

Another object of the invention is to provide a mechanism for the marketing of digital content which substantially eliminates purchase-time communications of the digital content to the end consumers.

Another object of the invention is to provide a mechanism for the marketing of digital content which is substantially ambivalent to the underlying nature of the digital content.

And, another object of the invention is to provide a mechanism for the marketing of digital content which operates continuously, whenever consumers want and without need for the actual physical availability of vendor and financial intermediary parties.

Briefly, one preferred embodiment of the present invention is a system for marketing digital content on a personal computer. A communications system is provided to communicate between a client and a clearing house. The client resides on a user's personal computer and contains an inventory of assets, the digital content. The assets are protected from unauthorized use by a digital wrapper requiring at least one key for unwrapping. The client displays information about the inventory on the personal computer so that users can select particular assets. The client then transmits money representing payment for the selection and an identifier for it to the clearing house, which transmits back to the client a key associated with the selected asset. Once the client receives all of the required keys, the selection is unwrapped.

Briefly, a second preferred embodiment of the present invention is a method for marketing digital content on a personal computer. A pre-stored inventory containing a number of assets is provided on a user's personal computer. The assets are instances of the digital content and are protected from unauthorized use by a digital wrapper requiring at least one key for unwrapping. Information about the inventory is displayed on the personal computer and a user makes a selection representing a particular asset. Money, representing payment for the selection, is then transmitted along with an asset identifier to a clearing house, via a communications system. The clearing house then sends back a key. Again, once the client receives all of the required keys, the selection is unwrapped.

Briefly, a third preferred embodiment of the present invention is a client for marketing digital content on a personal computer. The client resides on a personal computer having a storage system suitable for storing an infrastructure engine and an inventory. The infrastructure engine includes user and communications interfaces, and the inventory contains a number of assets which are each instances of the digital content. Each asset is protected from unauthorized use by a digital wrapper requiring at least one key for unwrapping.

An advantage of the present invention is that it provides a digital content marketing mechanism operating at the speed of digital electronics, yet which employs the conventional, time proven, widely understood, and trusted transactional interrelation of consumer, financial intermediary, and vendor.

Another advantage of the invention is that it in many cases it can provide popular sizable instances of digital content to its consumers much more rapidly than existing systems. Since the invention permits storage of a substantial inventory of the digital content locally, the communications delay inherent in transmission of large BOB's (bags-of-bits) is eliminated when a desired item is locally "in stock."

Another advantage of the invention is that it generally handles digital content generically as BOB's, but does permit optional inclusion of content specific after-receipt handling for specific types digital content.

Another advantage of the invention is that it may be entirely automated and may employ communications and outside services which may also be entirely automated. Because the invention uses communications services which are always available, users never have to travel to a conventional market location, i.e., another geographic point. And because the outside services are always available, e.g., financial intermediaries, or inventory information and update providers, the users of the invention may employ it even when conventional markets are closed.

Another advantage of the invention is that it may employ a graphical user interface which users of conventional marketing mechanisms readily understand and find intuitive to learn and use. For example, the user interface may present a village containing stores having aisles stocked with digital content assets, which the user selects and places in a shopping cart until a check-out operation is used to complete purchase. The village provides a unifying geographic metaphor, while the stores can provide either asset category or asset source metaphors. The stores may advertise and carry out commerce at various levels of directness, and particularly by easily providing several audio and visual channels in each. They can thus feature the three main activities of shopping for digital products, viewing events (a digital service), and communicating (also a digital service) in chat and learning sections.

Another advantage of the invention is that it is economical for all involved. The vendors may easily and cheaply set up stores, since no real world physical fixtures and extensively repetitive stock of inventory is required. Only a master copy of an asset need be stored in the inventory, not multiple copies of such (and a vendor will never run out of copies). The financial intermediaries can centralize and operate using widely available communications mediums, rather than having to operate extensive distributed service outlets. And, ultimately, via market competition, some portion of the reductions in operating costs caused by the above will be passed on to the end users, the consumers.

And, another advantage of the invention is that it may include varying levels and strengths of protection for intellectual property rights embodied in the assets, to provide confidence to the suppliers of the assets.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which:

FIGS. 2*a-b* are basic stylized depictions of the business model used by the invention;

FIGS. 10*a-e* show a search GUI views accessible via the GUI views in FIGS. 6-8, where FIG. 10*a* depicts an asset name based search, FIG. 10*b* depicts a provider name based search, FIG. 10*c* depicts the search of FIG. 10*b* expanded to include particular assets from a specific provider, FIG. 10*d* depicts a category based search, and FIG. 10*e* depicts an overview search based on a village map metaphor.

BEST MODE FOR CARRYING OUT THE INVENTION

Figure 1A:
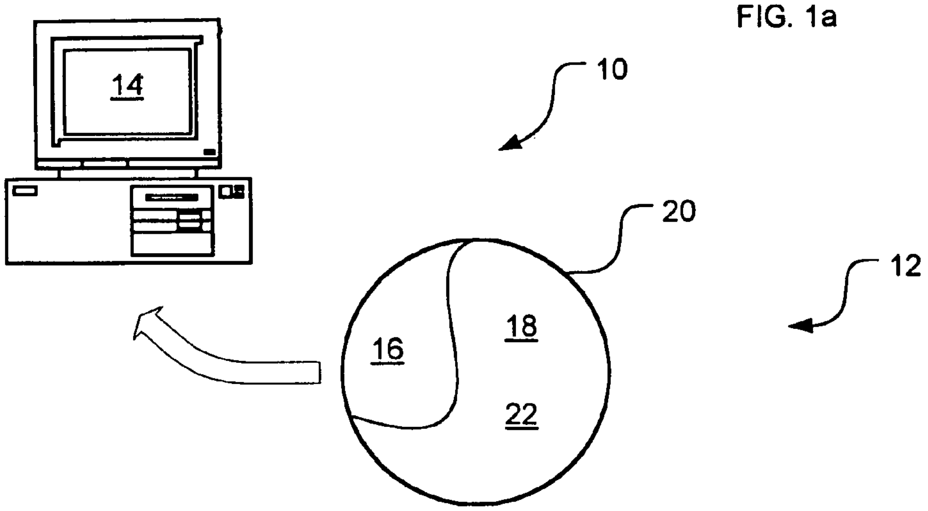
FIGS. 1*a-b* are basic stylized depictions of how the invention may reside in a users personal computer.

A preferred embodiment of the present invention is a digital content vending "machine" ("DCVM"). As illustrated in the various drawings herein, a form of this preferred embodiment of the inventive device is depicted by the general reference character 10.

The DCVM 10 may be advantageously viewed using two analogies. The first of these, which is alluded to by its label, is the vending machine. This analogy serves well for providing a general overview of the invention as a system for vending digital content. The second analogy is the village square, which the inventors use for the graphical user interface (GUI) of the invention's preferred embodiment. This village square analogy serves particularly well for giving users an easily grasped and usable perception of the invention as a system for purchasing digital content.

A conventional vending machine, such as a coffee machine, for example, will sell its primary commodity (coffee), but then often also sell parallel market items, like tea and soup, and dispense optional items, like cream and sugar. Similarly, the DCVM 10 sells as its primary commodity digital products, but it also may sell related information and services for such, and also dispense customer support and access to communications with like minded consumers. Thus, the DCVM 10 provides both digital products and digital services, i.e., digital content.

The DCVM 10 may be implemented to resemble a conventional town center or village square (i.e., a commercial hub, similar to a shopping mall today). In such a real place there will typically be shops or stores catering to different tastes, income levels, professions, ages, etc. There will be stores that provide primarily goods, and others that provide primarily services. There typically will also be diverting entertainments, and areas set aside simply for communications with those sharing similar interests. And there usually will be directory plaques or information kiosks to help find where things are at and to assist in getting to them. As products and services increasingly become digital, this village square analogy is readily extendable into the DCVM 10 as now described.

Figure 1B:
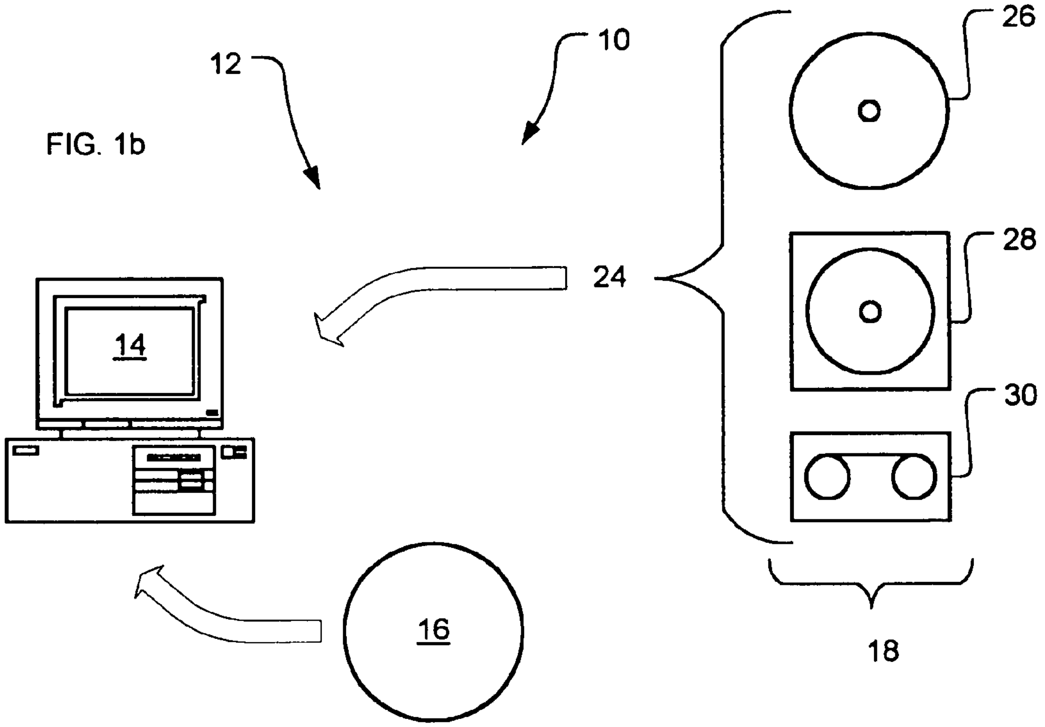

FIGS. 1*a-b* present how the client 12, i.e. a client application, resides on a user's personal computer (PC 14) and contains both an infrastructure 16 and an inventory 18. The infrastructure 16 is an engine that handles the functionality of the DCVM 10, and the inventory 18 is the local collection of assets 22 of merchandise or units of service.

The infrastructure 16 is relatively static. Like most software applications, it perhaps merits an occasional upgrade as new features become available, but otherwise it is generally installed and left alone. It is anticipated that the infrastructure 16 will usually be stored on a local hard drive 20, although in some case a hard drive 20 on a local area network (LAN; not shown) may also be acceptable. Keeping the infrastructure 16 local insures good overall DCVM 10 responsiveness.

In contrast, the inventory 18 is relatively dynamic, potentially including assets 22 such as computer software products, music, video, and anything else which can be reduced to digital format and electronically transmitted and stored. The inventory 18 may be loaded on a local device, or it may also be accessible over a LAN having an appropriate bandwidth, since storage capacity and transfer rate are more important than responsiveness for it.

In FIG. 1*a* both the infrastructure 16 and the inventory 18 are depicted residing together in fixed storage in the PC 14. Today such fixed storage will typically be hard drives 20 (also sometimes termed a "fixed drive"), but as other large capacity and fixed in place storage means become common they may be used instead.

FIG. 1*b* depicts how the infrastructure 16 may reside in fixed storage, but the inventory 18 instead reside in a removable media 24 which is accessible by the PC 14. Some common current examples of such removable media 24 are CD 26, DVD 28, and tape 30, but still others are easily possible.

In present embodiments of the DCVM 10 which are hard drive 20 delivered approximately one to four gigabytes of storage are used. Of this the infrastructure 16 is roughly 50-100 megabytes in size and the inventory 18 takes up the balance. For CD 26 delivered embodiments only about 600 megabytes are used for the inventory 18. However, as larger capacity hard drives 20 and higher capacity removable media, like DVD's 28, become widely available the infrastructure 16 and particularly the inventory 18 may be made larger, as desired.

In one preferred embodiment, initial delivery of the infrastructure 16 is on the hard drives 20 of new PC's 14. However, the DCVM 10 may also be "delivered" on a new hard drive 20 used for upgrading an existing PC 14. Or it may even be delivered via conventional software installation by loading it from removable media 24 into the PC 14, or by downloading it from an online source and then installing it (a newer installation technique becoming common today). Initial delivery of the inventory 18 may similarly be in pre-loaded format on the hard drive 20, or by provision on removable media 24 which is then placed as needed into the PC 14 for access by the infrastructure 16 (typically depending upon the capacity of the hard drive 20).

Of course, like in real world stores, the inventory 18 of the DCVM 10 needs to be replenished as sales occur, updated as new versions become available, and expanded as suppliers change and new offerings become available. Therefore, the DCVM 10 may be maintained and updated using intelligent push technology over modern networks, like the Internet.

Such push technology (e.g., compatible with ACTIVE DESKTOP™, Microsoft Corporation, and NETCASTER™, Netscape Corporation) may also be used to provide a one-to-one buying and selling experience for users, and to allow individual preferences to be collected and catered to without need of human intervention.

FIG. 2*a* depicts, in simplified form, the business model used by the inventive DCVM 10. The end users are termed customers 40 and those entities providing the digital content are termed vendors 42. The vendors 42 operate stores 44 (a term used broadly to denote a point of supply for any digital content, regardless of whether overtly commercial in nature). A graphical user interface (GUI), termed the village 46, is used to present collection of the stores 44 as a virtual setting in which the vendors 42 vend and the customers 40 consume. The stores 44 in the village 46 advertise and carry out commerce at various levels of directness, and particularly through several audio and visual channels in each. It is expected that each store 44 typically will feature three main activities: shopping for digital content, viewing events, and communicating.

FIG. 2*b* depicts a more complete version of the business model. In addition to their local presence, the vendors 42 are also collectively represented on a master server 48, and all can invoke the assistance of a financial intermediary termed a clearing house 50. The clearing house 50 facilitates complex purchase scenarios, permits large numbers of stores 44, and more dynamically provides service to both the customers 40 and the vendors 42.

In a typical example purchase scenario, a customer 40 transmits money 52 and an identifier 54 to the clearing house 50. The clearing house 50 then credits the account of the particular vendor 42, and transmits back to the customer 40 a key 58. Next, usually automatically under control of the infrastructure 16, the customer 40 sends this key 58, or part of it, on to the master server 48, which sends back another key 58 (the keys 58 are typically all unique). Again automatically, if desired, the infrastructure 16 uses this second key 58 to digitally "unwrap" an asset 22 of inventory 18, which has now been "purchased." Since the money 52, identifier 54, and the keys 58 can all be relatively small, compared to the asset 22 being purchased (typically many megabytes in size), even transactions in very sizable digital content can be carried out quite quickly.

Of course, simpler purchase scenarios are possible. The customer 40 might deal directly and entirely with the master server 48. However, at least for the near future, there is no reason to expect that customers 40 and vendors 42 will feel secure without some "online" commercial intermediary such as the clearing house 50. Alternately, if the asset 22 is already part of the inventory 18, and if the vendor 42 completely trusts the clearing house 50, and if the clearing house 50 is willing to carry appropriate keys 58, the key 58 sent back from the clearing house 50 may be made suitable for directly digitally unwrapping the asset 22. However, since some communications already must take place anyway, and since that will often already be occurring over a medium such as the Internet, there is relatively little burden added by the customer 40 to master server 48 communication legs to the transaction.

The keys 58 play an important security role. They unlock a digital wrapper 60 (not shown; but numbered for reference) protecting the asset 22 once it has been paid for. In most cases the vendors 42 will strongly want such protection, to suppress unauthorized copying of their intellectual property. The digital wrapper 60 may use simple serial number entry to enable or disable a reminder feature, or it may use soft or hard encryption (both conventional concepts). Alternately, the digital wrapper 60 may use what the inventors term a "two sector steal."

In the two sector steal, embodiments of the inventive DCVM 10 that store the inventory 18 on a hard drive 20 have two disk sectors of information (an amount empirically found preferable by the inventors) initially omitted. Upon asset 22 purchase, data in the appropriate "stolen" sectors can be supplied, either as part of a key 58 itself, or via use of a key 58 to unlock sector data which has been present all along in an encrypted format. In this manner the asset 22 remains unusable until the missing parts are supplied, yet can be unwrapped reasonably quickly, particularly if the key is electronically communicated to the PC 14.

The two sector steal provides particular advantages to OEM suppliers of PC's 14 and upgrade hard drives 20. The assets 22 can be supplied entirely pre-installed and default configured, but with the sectors stolen (note that sector stealing eliminates the need for bulk encryption). When such an asset 22 is then purchased the sectors are merely installed (or in place decrypted) and the asset 22 is immediately and assuredly ready for use, which will eliminate many technical support calls to the OEM suppliers. And when the customers 40 do have to seek help, the issue of who is to blame for the problem is substantially reduced, which greatly increases their willingness to pay for support and still hold the supplier in high regard.

For additional security, in addition even to the use of keys 58, at the option of the vendor 42 (perhaps under a contractual obligation with the actual software publisher), assets 22 may be "machine bound" to a limited number of physical hard drives 20. For example, as discussed further below, even verbal delivery of keys 58 to customers 40 via the telephone can be used by the DCVM 10. Such keys 58 obviously must be manageable in size and directly enter able by the customers 40, yet it is highly desirable by the vendors 42 that the customers 40 not be able to use one key 58 to unwrap more than one copy of an asset 22. This is easily provided for if the keys 58 are each specifically related to some relatively unique indicia on the hard drives 20. A Help/About menu access in the village 46 can provide a short code based upon such a unique indicia, and a customer 40 can then enter such a code with a telephone touch-tone pad to receive a key 58 which only unwraps an instance of the particular asset 22 on their hard drive 20. In this manner, each asset 22 purchased from the DCVM 10 may be restricted from even highly skilled and determined efforts at unauthorized use.

The keys 58 may also play an important commercial role, facilitating payment and accountability of all parties involved. They may act as customer 40 receipts for payment, and vendor 42 vouchers for payment. Assuming that unique keys 58 are used and are retired after one complete transactional cycle, if the a key 58 is ever lost it can simply be reissued, since it will only work once and then for only its intended purpose. As noted above, use of a second key 58 is optional, but much can be gained by doing so. This permits the vendor 42 to closely track its market, and, more importantly, keeping the vendor 42 in the "loop" permits better customer 40 support. For example, say that a customer 40 starts a purchase scenario for an asset 22 which is in the local inventory 18 in version 4.10, but the master server 48 now has a newer version 4.15 of that asset 22 in stock. Rather than simply return a key for version 4.10, an offer can be communicated to the customer 40 to (1) go ahead and send the key 58 for version 4.10, or (2) transmit version 4.15 of the asset 22 to update the local inventory 18 and also send the key 58 which will unwrap it, or (3) cancel the transaction (perhaps to be resumed after the customer is mailed a CD 26 containing an updated inventory 18).

The master server 48 can also take an active role in maintaining the infrastructure 16 and the inventory 18, by send updates 62 to the PC 14 containing fixes and enhancements of the infrastructure 16 and new assets 22 for the local inventory 18. By using the master server 48 as a collector of preferences of the customer 40 to selective apply such updates 62 the inventory 18 can be particularly tailored to the preferences and statistical purchase history of the customer 40.

To assist the master server 48 in this role, customer 40 click (and key stroke) streams can be tracked on the client 12 running on the PC 14. This in addition to a substantially unique indicia for the client 12 can then be used with Internet push technology for determining and transmitting appropriately tailored updates 62, or at least prioritizing such updates 62. The indicia used may be a code pre-stored in a hard drive 20 or a removable media 24, or it may be generated on the first execution of the client 12, or it may be provided as a registration process on the master server 48.

Figure 3:
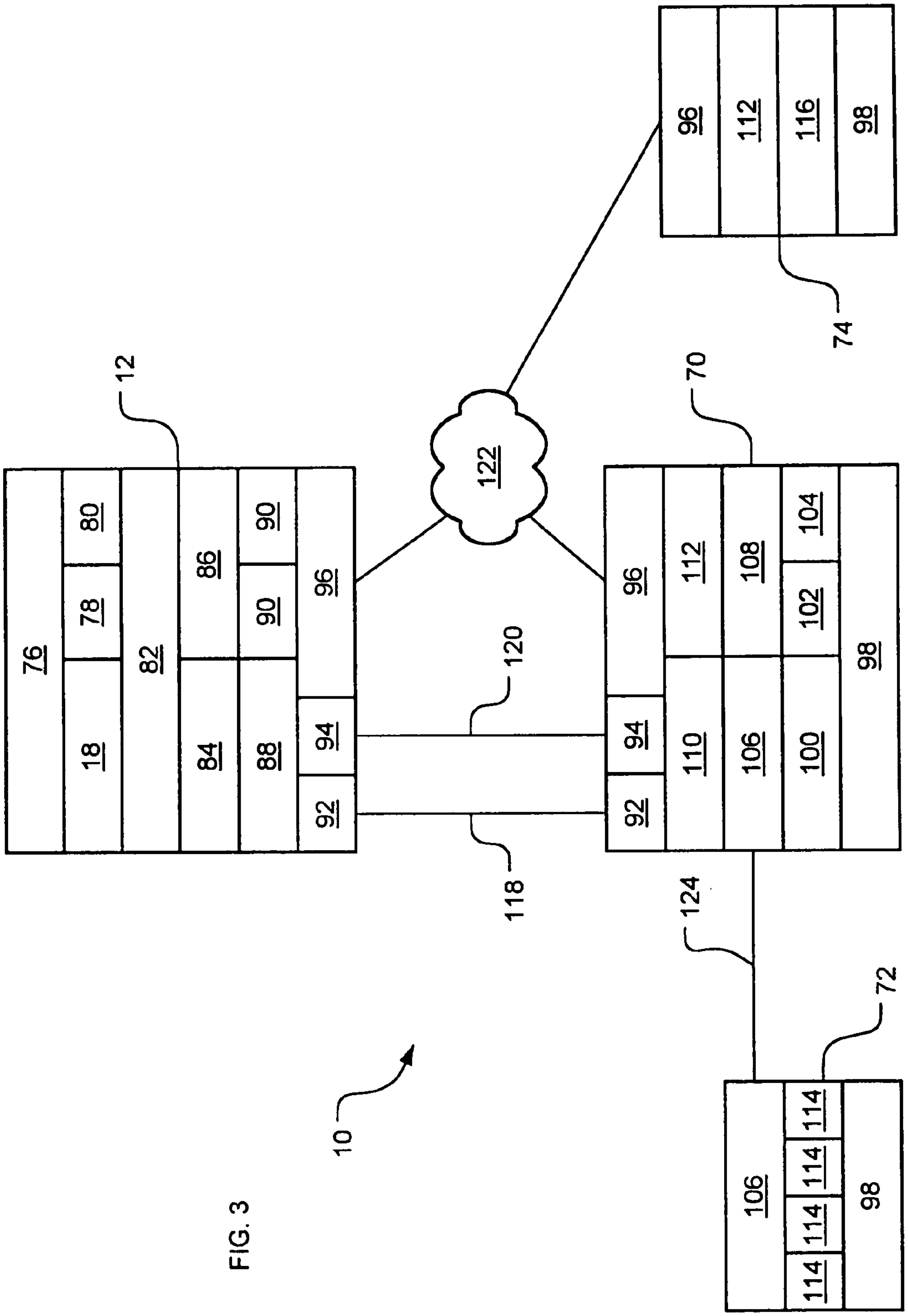
FIG. 3 is a detailed block diagram of a suitable architecture for the invention.

FIG. 3 depicts a suitable architecture for implementing a full featured embodiment of the inventive DCVM 10. The client 12 runs on the PC 14 of the customer 40, a master application 70 runs on the master server 48, a clearing house application 72 runs on the clearing house 50, and a streaming media service 74 is provided.

The client 12 resides on the PC 14 in a layered structure. The lowest layer (hardware and BIOS layers in the PC 14 are not shown) is a suitable operating system (a client OS 76; e.g., WINDOWS 95 or WINDOWS 98™, Microsoft Corporation of Redmond, Wash.). The next layer includes the inventory 18, a village profile 78, and a preference log 80. Atop this is a layer formed by a village manager 82, which using the village profile 78 and preference log 80 permits tailoring for particular customer 40 needs and preferences. At a higher layer are a village interface 84 and an update sub-client 86. Since the village interface 84 itself needs updating from time to time, the update sub-client 86 needs to be in at least as high a layer. Atop this is a layer that includes an order entry interface 88, and client protocols 90 (e.g., Marimba, BackWeb, and/or Intervu tuners for use with the Internet) for communications. Finally, within the client 12, is a communications layer which includes a telephone module 92, a private network module 94, and an Internet module 96 for respectively accessing these mediums of communication.

The master application 70 similarly resides in a layered structure on the master server 48. The lowest layer (again hardware and BIOS layers are not shown) is a suitable operating system (a server OS 98; e.g., WINDOWS 98™, Microsoft Corporation of Redmond, Wash.). Atop this are a master interface 100; a profile database 102, from which portions transmitted to a client 12 become stores 44; and a master inventory 104, from which portions transmitted to a client 12 become assets 22 in the inventory 18. The next layer includes a financial peer 106 (discussed further presently) and an update sub-server 108. Atop this is a layer including an order interface 110 and server protocols 112 (e.g., a Marimba or BackWeb transmitter for use with the Internet). Finally, within the master application 70, is a communications layer which includes a telephone module 92, a private network module 94, and an Internet module 96.

The clearing house application 72 is run by the clearing house 50, and thus effectively is also a server. It also has as a lowest layer a suitable operating system (another server OS 98). Atop this are financial modules 114, which handle services like anti-fraud, pre-authorization, reporting, etc. And atop this is a financial peer 106, for communicating directly with the equivalent in the master application 70.

The streaming media service 74 has a suitable server OS 98 which supports an audio-visual database 116, atop that server protocols 112 (e.g., an Intervu transmitter for use with the Internet), and also an Internet module 96.

The client 12 communicates with the master application 70 via either telephone 118 (touch-tone entry or using voice recognition, and pre-recorded or generated message replies), a private network 120, or the Internet 122. Notably, the first two of these reach customers 40 who are not yet on the Internet 122 (still about 60% of current PC 14 owners according to some surveys).

If a telephone 118 is used (say to an 800 number), the customer 40 may manually enter credit card information on the tone pad, and then hear recited back a simple key 58 which is used to unwrap the asset 22 purchased (of course, this could also be a conventional verbal human transaction, but such are inefficient). The key 58 may be entered by the customer 40 at the PC 14 either as it is received, or it may be written down and used later when the customer 40 is off the telephone 118. If a private network 120 is used, the infrastructure 16 may alternately automatically unlock the purchased asset 22, the customer 40 may still note the key 58 (presumably a simpler one) for later manual entry. If the Internet 122 is used, the infrastructure 16 will automatically use the key 58 to unwrap the asset 22 now purchased, and the key can accordingly be larger and more complex. It should also be appreciated that groups of customers 40 anywhere on a local network can also use the private network 120 and the Internet 122 variations.

In FIG. 3 the master application 70 and the clearing house application 72 are depicted as connected via a dedicated link 124, i.e., all commercial transactions go physically through the master server 48, but with minimal involvement of the master application 70 itself. This provides for universal access by the client 12 via the master application 70, even over the telephone 118 or private network 120. This also provides for very high security, but that may be dispensed with as alternate security means and confidence in them become widespread, perhaps soon with secured communications over the Internet 122.

Figure 4:
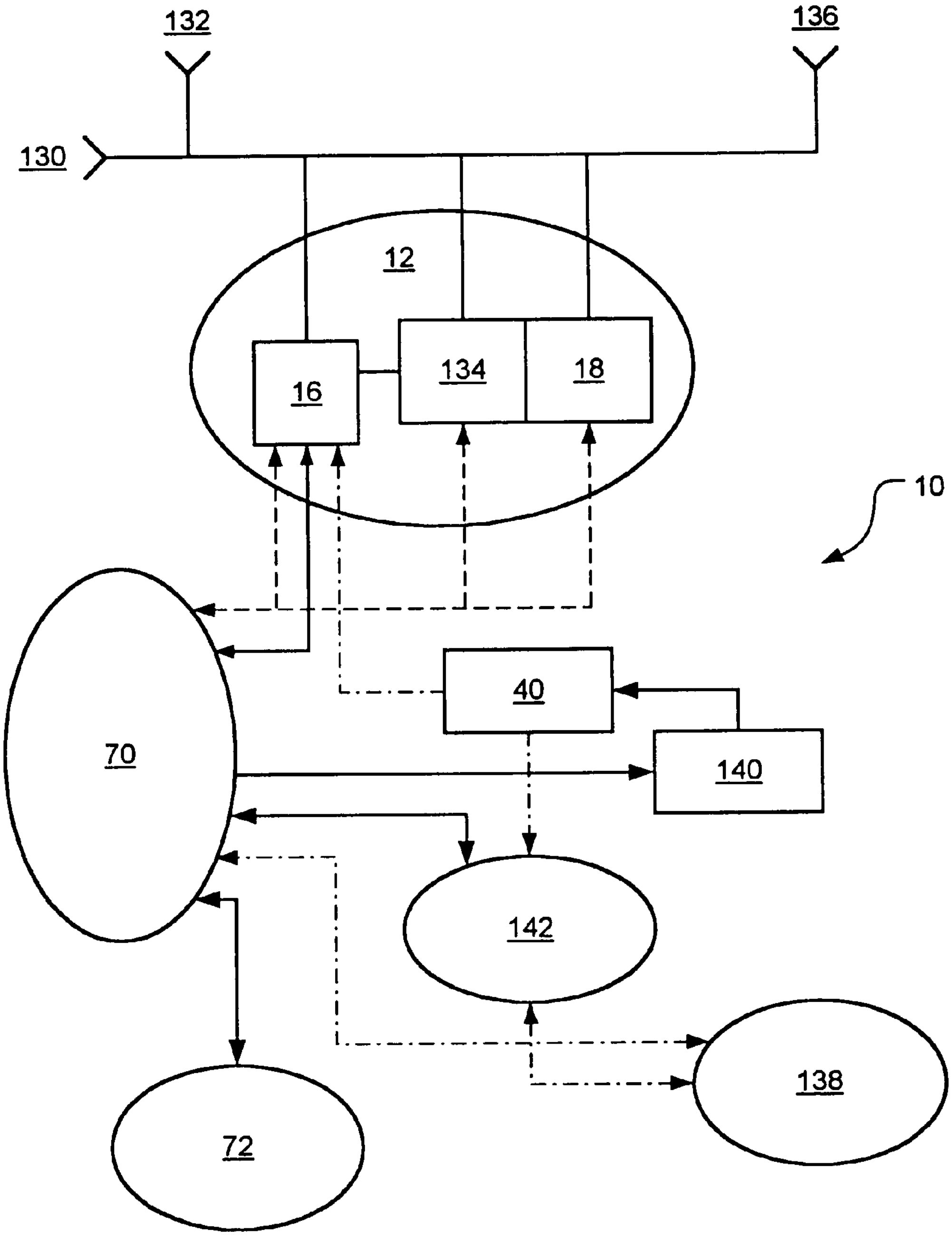
FIG. 4 is a block diagram depicting a functional overview of the invention.

FIG. 4 is a block diagram depicting a functional overview of the inventive DCVM 10. The client 12 is typically installed onto the hard drive 20 of a PC 14 by either an original equipment manufacturer (OEM) (step 130) or loaded by a potential customer 40 (step 132) from a removable media 24, such as a CD 26. The client 12 then contains the infrastructure 16, which provides the GUI of the village 46 to the customer 40, and which is the engine that presents the stores 44 and accesses an inventory database 134 and the inventory 18 itself (either on the hard drive 20 or still on the removable media 24).

As an aside, the impression may have been conveyed that the stores 44 always reside on the hard drive 20 as part of the infrastructure 16. However, while often desirable, this need not always be the case. Since the DCVM 10 permits addition and deletion of stores 44, and since large number of stores 44 may be provided, general access to particularized sub-sets of the inventory 18 may be accomplished by putting only popular stores 44 onto the hard drive 20, and leaving the rest on the removable media 24. Further, as the customer 40 deletes some stores 44 and as the village 46 accumulates actual usage information, the stores 44 actually on the hard drive 20 can be changed.

For local updating of the client 12 after installation, particularly for updating the sizable inventory database 134 and the inventory 18 (say if it is stored on a hard drive 20), additional removable media 24, such as CD's 26 or DVD's 28, may later have their contents copied into the PC 14 (step 136). However, this can be reduced considerably, or even eliminated, if a suitable communications means is available.

Once the client 12 is installed, communications with the master application 70 can ensue, directly from the customer 40 through the infrastructure 16 and indirectly from the inventory database 134 and the inventory 18 (as depicted in FIG. 4 in uniformly dashed lines). The master application 70 and the clearing house application 72 are also depicted as able to directly communicate. Further, communications from technical support 138 can pass through the master application 70 to and from the client 12. Since a large percentage of PC's 14 on which the DCVM 10 will be loaded will employ step 130 (OEM loading), it is particularly anticipated that this will facilitate access to OEM supplied technical support 138.

The customer 40 can also request fulfillment of orders for hard goods 140 via the client 12. Such hard goods 140 may be ancillary to the inventory 18, e.g., manuals for computer software asset 22 in the inventory 18, or they may be entirely separate, i.e., permitting the DCVM 10 to optionally be used as a catalog server for entirely non-digital content as well.

However, the customer 40 is not restricted to only communicating via the client 12 to the master application 70. The customer 40 may still use a simple telephone, say using a toll free number, to verbally communicate with phone support 142, and via the phone support 142 to also access the technical support 138 (depicted in FIG. 4 in non-uniformly dashed lines). This particularly facilitates the customer 40 being able to get assistance when the client 12 is "broken" and to advise that something has gone awry in the master application 70.

Figure 5:
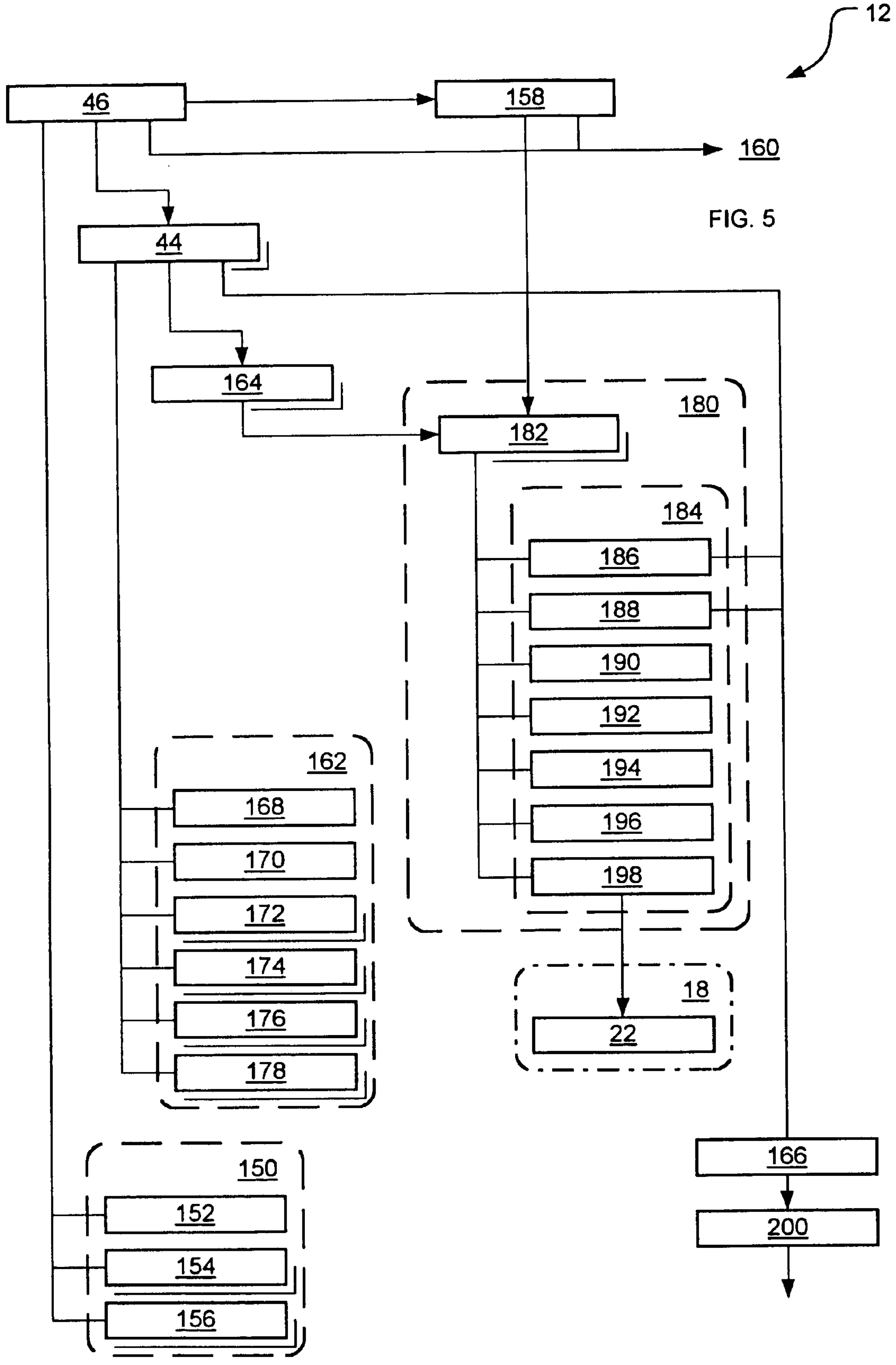
FIG. 5 is a block diagram depicting a navigational overview of portions of the invention which reside in a client computer system.

FIG. 5 is a block diagram depicting a navigational overview of the client 12. At the highest level is the village 46, which has a village template 150 including a village video 152, village ad's 154, and a number of store controls 156 (combination button-icons). From the village 46 access is also available to a search feature 158, which provides a quick way to find particular assets 22 (described below), and to an extra assets feature 160 which provides access to digital content not presently in the inventory 18 (i.e., in the master inventory 104 on the master server 48). From the search feature 158 there is also access to this extra assets feature 160.

The store controls 156 of the village 46 provide access to the stores 44. Each store 44 has a store template 162, aisles 164, and a shopping cart 166. The store template 162 includes store data 168 (e.g., name, etc.); a store video 170, describing the store 44; and store ad's 172, analogous to traditional end-cap advertisements; optional Internet links 174 for the store 44, i.e., for alternately reaching the sponsoring vendor 42; optional promotional ad's 176, for particular assets 22, i.e., "hot deals"; and aisle controls 178.

The aisle controls 178 provide access to the aisles 164, usually with a plurality appearing for each store 44. Each aisle 164 has an associated aisle template 180.

The aisle templates 180 each include a number of asset controls 182, each in turn associated with an asset template 184. An asset template 184 includes asset data 186 (e.g., name, provider, category, version, etc.), an asset price 188, an asset description 190, an asset video 192, an asset ad 194, a third-party opinion 196 (i.e., a review of the asset 22), and an asset link 198 pointing to where the particular asset 22 is stored in the inventory 18.

By appropriate customer 40 selection when viewing an asset template 184 appropriate information, such as the asset price 188 and the asset link 198, are sent to the shopping cart 166, a place where information identifying prospective asset 22 purchases accumulates prior to formal purchase. Later, back at the store 44 level, the customer 40 can then access the shopping cart 166 and invoke an order module 200 to selectively complete formal purchase of chosen assets 22 in the shopping cart 166.

Figure 6:
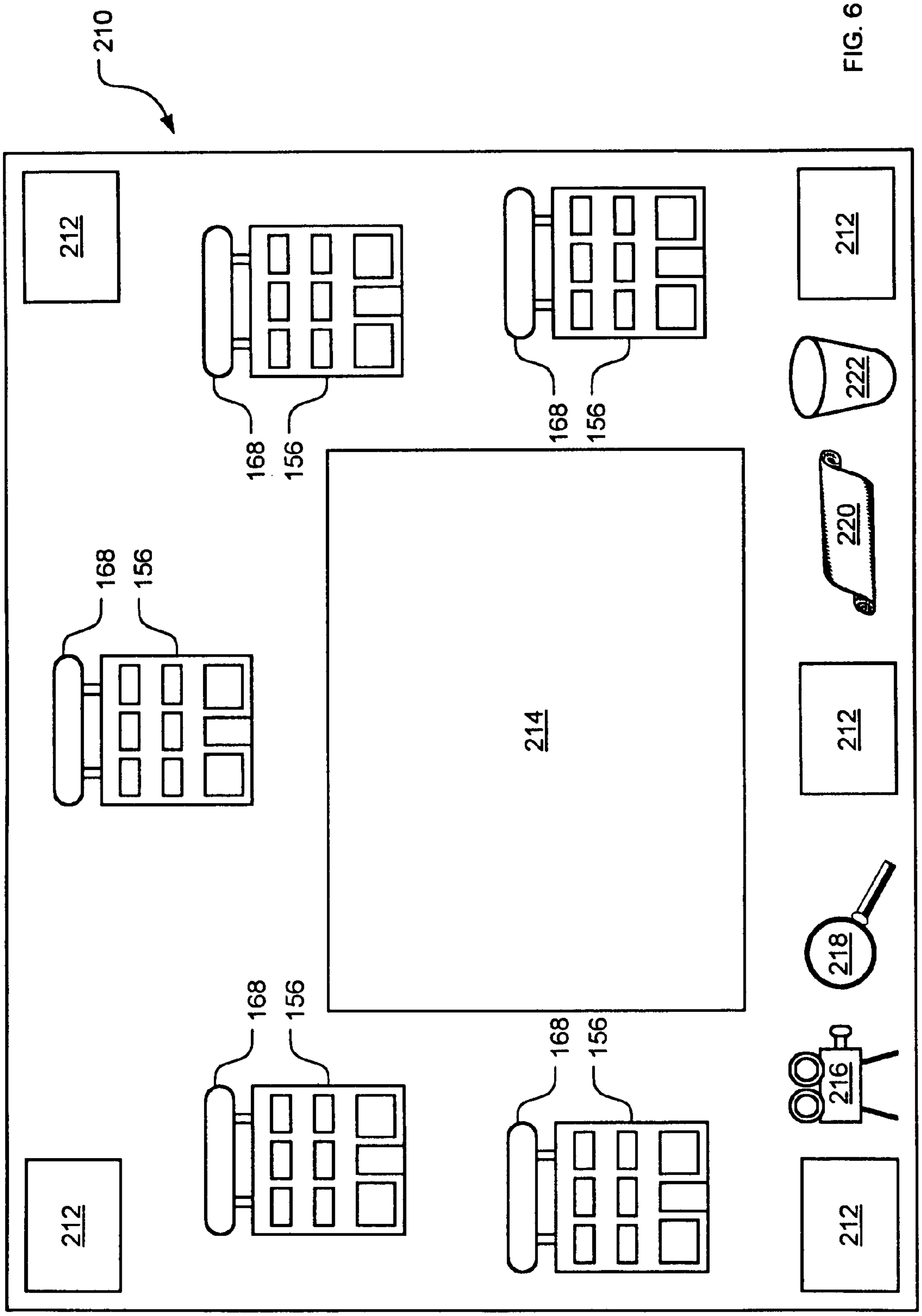
FIG. 6 is a depiction of a top view, or "village" view, presented by a graphical user interface (GUI) suitable for use on the client computer system.

FIG. 6 depicts a suitable village view 210 for presentation to the customer 40. A series of ad cells 212 are placed about the village view 210. These may contain either fixed or banner advertisements from the village ad's 154. The major features of the village view 210 are the store controls 156, each with respective store data 168 prominently displayed, and a centrally placed video display 214. Further provided, at the bottom of the village view 210, are a video control 216, to start/restart the village video 152 in the video display 214; a search control 218, which invokes features described below; a guarantee control 220, which invokes display in the video display 214 of business information about the parties operating the master application 70, the clearing house application 72, and the respective vendors 42; and a delete village control 222, to entirely eliminate the DCVM 10 from the PC 14.

Figure 7:
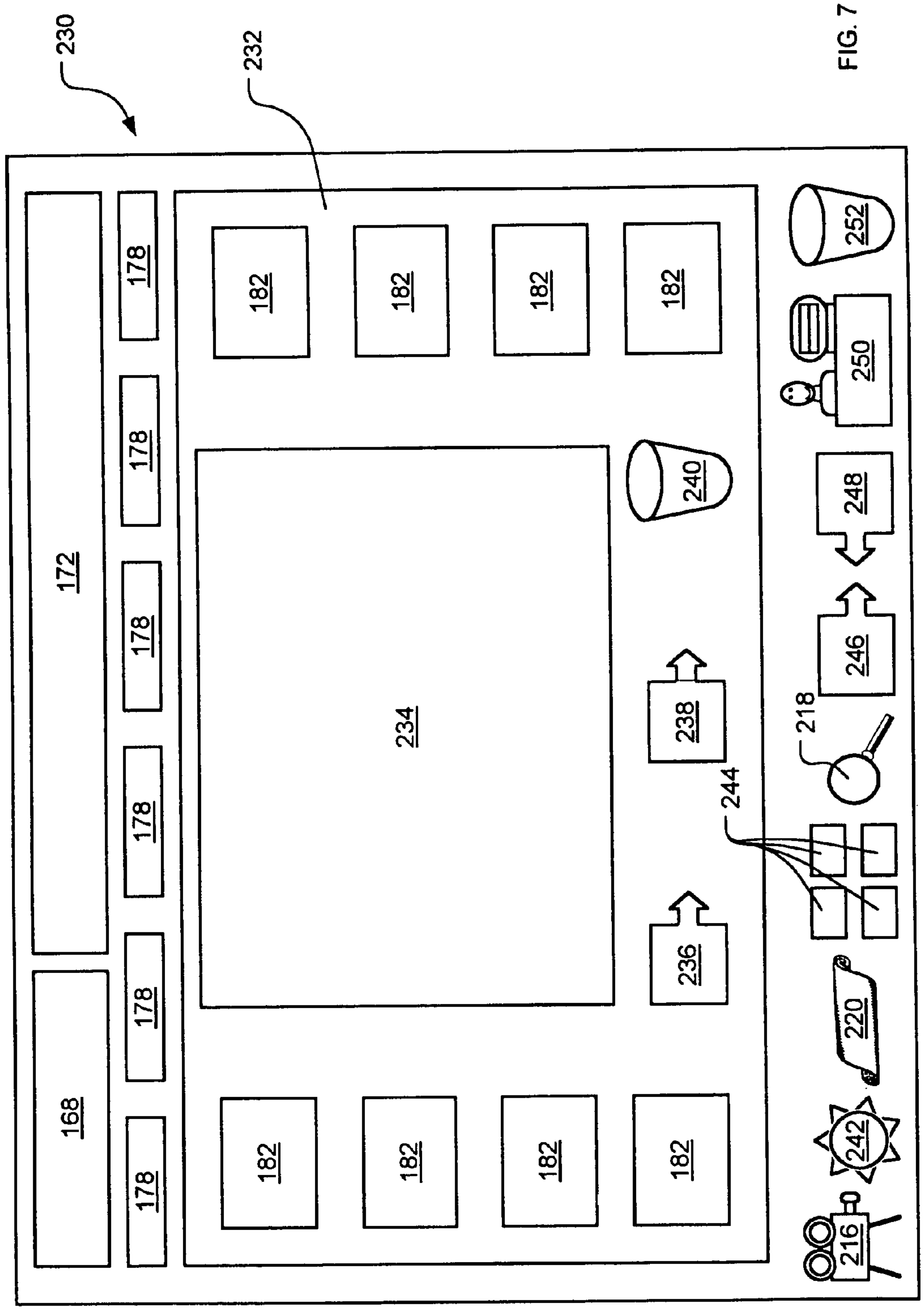
FIG. 7 shows a store GUI view, accessible via the GUI in FIG. 6.

FIG. 7 depicts a suitable store view 230 for presentation to the customer 40. The store data 168 (at least the store name) and the store ad 172 are displayed at the top. Below is a row containing the aisle controls 178. And below that row is an aisle sub-view 232, which changes depending upon which aisle control 178 is currently selected. The aisle sub-view 232 includes a video display 234, asset controls 182, an aisle update control 236, a next page control 238 (to display a subsequent view of assets, since aisles may often contain more than will fit on one view), and a delete aisle control 240. At the bottom of the store view 230 are the video control 216, to here start/restart playback of the store video 170; a promo control 242, to start/restart playback of the promotional ad's 176; the guarantee control 220; a links control 244, to display the Internet links 174 for the store 44; the search control 218; an update store control 246; a return to village control 248, to return to the village view 210; a checkout control 250; and a delete store control 252, to remove the present store 44 from the client 12.

Figure 8:
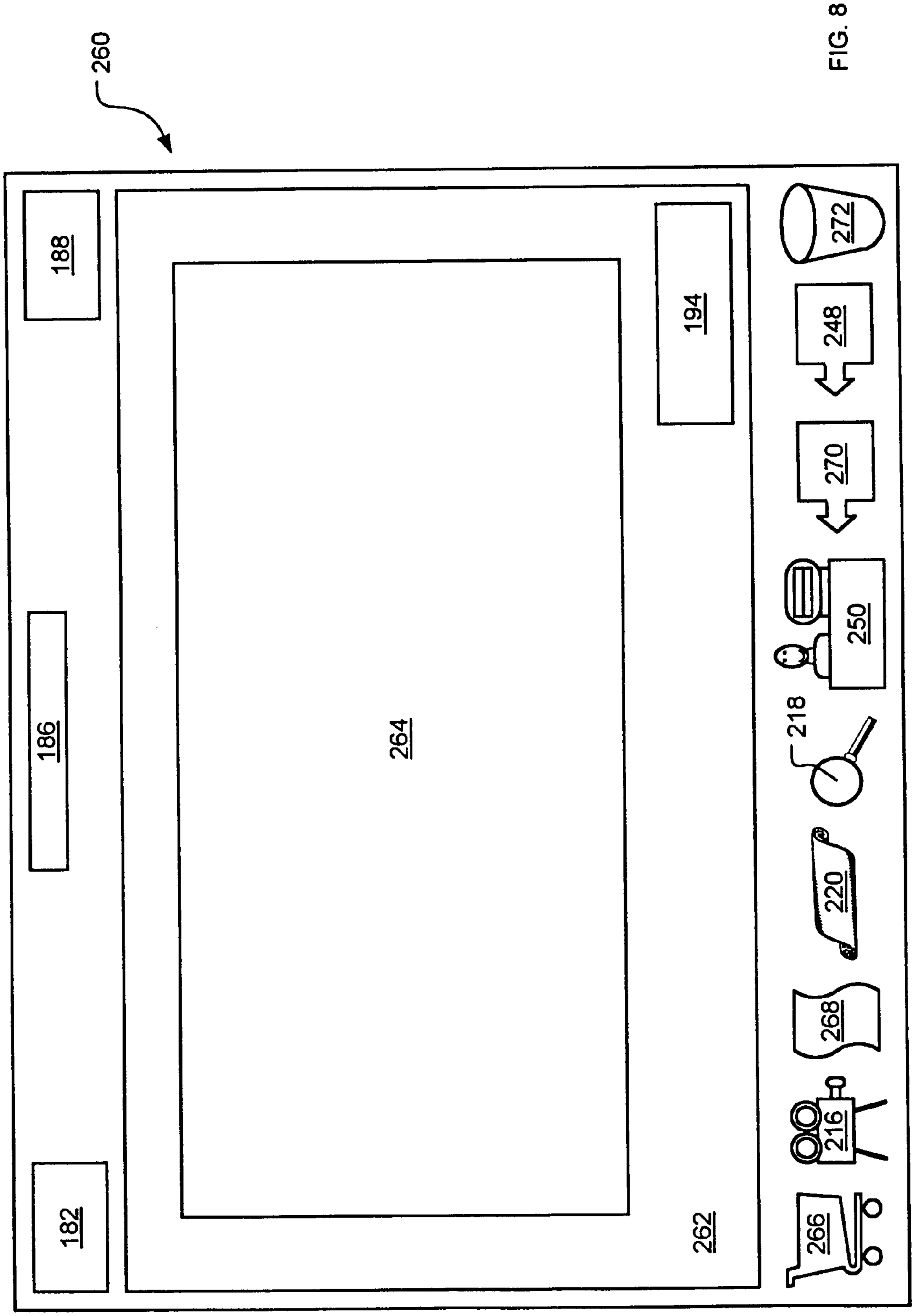
FIG. 8 shows an asset GUI view, accessible via the store view in FIG. 7.

FIG. 8 depicts a suitable asset view 260 for presentation to the customer 40. Displayed at the top are the asset control 182 (here acting only as an icon, since it cannot be selected to go to another view), the asset data 186 (at least the asset name), and the asset price 188. Below is an asset sub-view 262 which includes an asset display 264 and the asset ad 194 (typically a banner type ad, which "rotates" continuously).

At the bottom of the asset view 260 are a shopping cart control 266 (to add the present asset to the shopping cart 166), the video control 216, an opinion control 268, the guarantee control 220, the search control 218, the checkout control 250, a return to store control 270, the return to village control 248, and a delete asset control 272.

Depending upon operation by the customer 40, the asset display 264 presents either the asset description 190 (the default), the asset video 192, the third-party opinion 196, or guarantee information.

Figure 9:
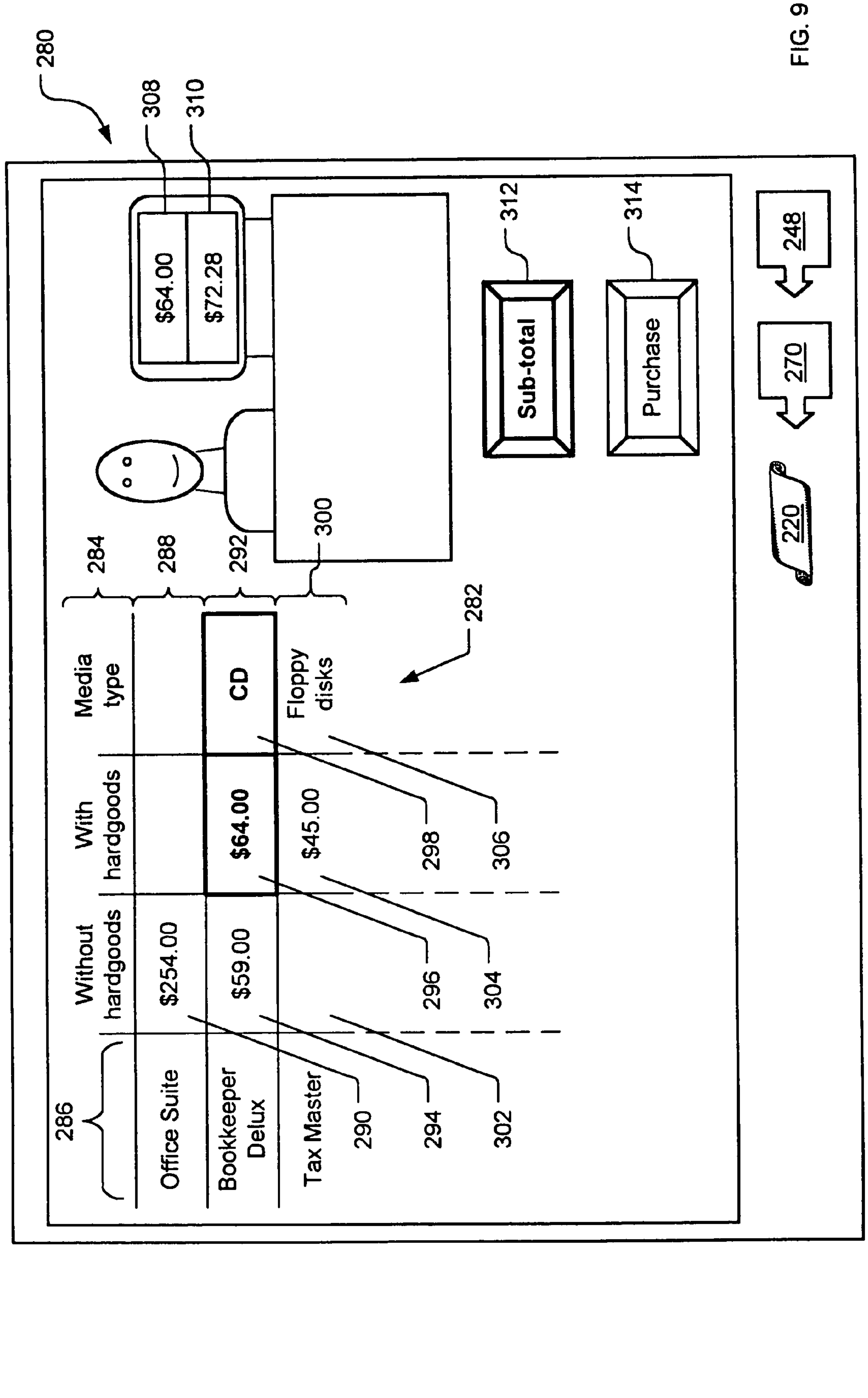
FIG. 9 shows a purchase summary and confirmation GUI view, i.e., a "check-out" view, accessible via either the store view in FIG. 7 or the asset view in FIG. 8.

FIG. 9 depicts a suitable checkout view 280 for presentation to the customer 40. Included is an asset table 282 which displays information about all of the assets 22 presently in the shopping cart 166. Across the top of the asset table 282 are column headings 284, indicating availability options, e.g., "without hardgoods," "with hardgoods," and "media type." Along the left side of the asset table 282 are row headings 286 containing respective asset names (from the asset data 186). Depending upon which columns they are in, the cells of the asset table 282 contain asset prices 188 or availability options, and in some cases also function as controls.

For example, assuming the availability options listed above in the asset table 282 presented in FIG. 9, the topmost row 288 contains data only in cell 290 (the leftmost). Further, cell 290 contains an asset price 188 which is not highlighted (in FIG. 9 heavy cell outline designates highlighting). This situation depicts that the asset 22 in row 288 is only available without hardgoods, and that the customer 40 has not yet selected this cell to confirm that they do want to purchase this.

The middle row 292 in this example contains asset prices 188 both in cell 294 and in cell 296, and cell 298 is highlighted and contains text describing a media type. This situation depicts that the asset 22 in row 292 is available both with and without hardgoods, at the respective prices, and that the "with hardgoods" option has already been selected by the customer 40 (as indicated by the highlighting of cell 296 rather than cell 294). The customer 40 here may, chose among multiple media types (as indicated by the presence of highlighting in cell 298). Further, since cell 298 is highlighted, the customer 40 may operate it as a control, say with a mouse double-click, to cycle between the available media type choices.

The bottom row 300 in this example contains nothing in cell 302, designating that this asset 22 always comes with hardgoods (say a manual); a price in cell 304 (un-highlighted, and thus as yet un-selected); and un-highlighted text in cell 306. The absence of highlighting for a media type indicates that no choice is available, so the customer 40 should be particularly sure that they can use the media type being noted.

Also appearing in the checkout view 280 are a sub-total box 308, a grand total box 310, a sub-total control 312, and a purchase control 314. The sub-total box 308 displays a running total of the asset prices 188 for selected assets 22 in the asset table 282 (note that only one of the three displayed assets 22 is actually selected in the example, so only its price is used in the sub-total). By activating the sub-total control 312 the customer 40 requests display in the grand total box 310 of the amount in the sub-total box 308 plus applicable shipping costs and taxes (here the sub-total plus 8.25% tax and $3.00 shipping and handling). Activating the purchase control 314 formally requests that purchase take place.

Across the bottom of the checkout view 280 are the guarantee control 220, the return to store control 270, and the return to village control 248.

Figure 10E:
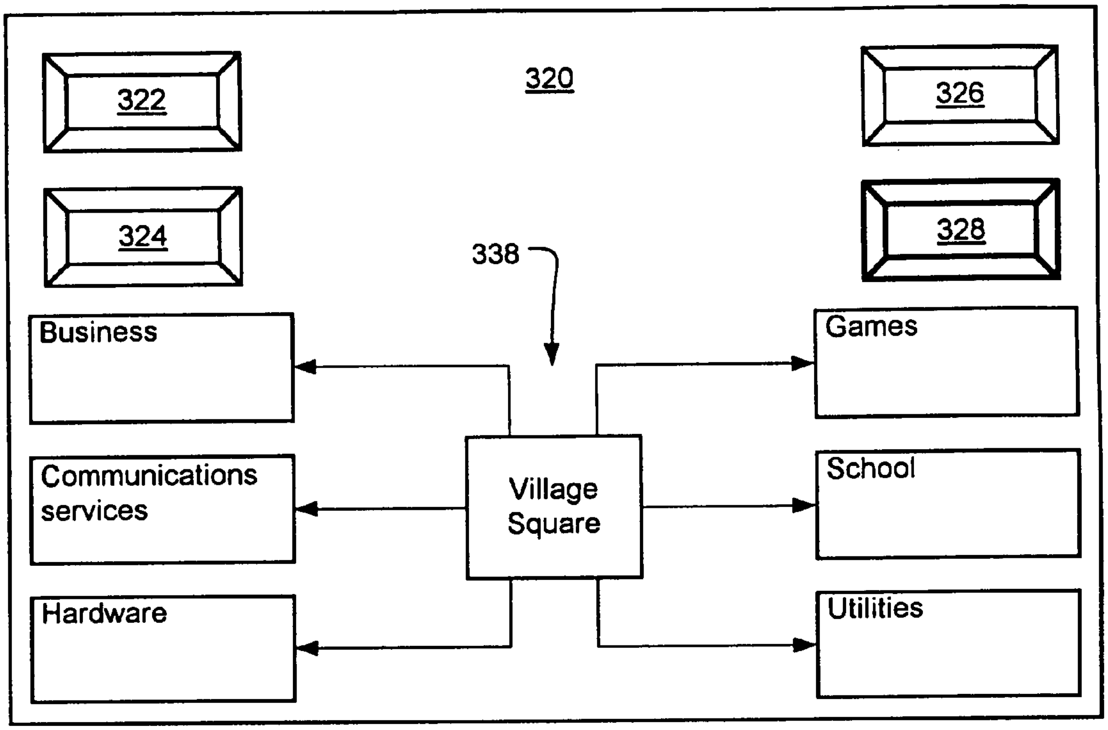

FIG. 10*a-e* are stylized depictions of the information presented to the customer 40 when the search control 218 is selected. A search view 320 then appears which includes an asset control 322, a provider control 324, a category control 326, a map control 328, a text entry box 330, a character selection array 332, and a list box 334. In some cases the list box 334 can further include a sub-list 336 (FIG. 10*c*), and in one case the text entry box 330, the character selection array 332, and the list box 334 may all be replaced with a map sub-view 338 (FIG. 10*e*).

FIG. 10*a* shows the default of a search view 320, i.e., a view first seen by the customer 40. The asset control 322 is highlighted (shown with a heavy lining in the figure) to confirm to the customer 40 that the asset based variation of the search view 320 is currently active. The customer 40 may select a provider control 324, a category control 326, or a map control 328 to use other variations of the search view 320. Or, if they have already done so, selecting the asset control 322 will return them to the variation of FIG. 10*a*.

In the asset based search view 320 of FIG. 10*a*, the customer 40 may either type initial letters of the asset name (as it appears in the asset data 186) into the text entry box 330 (as depicted in FIG. 10*a*), or mouse click a first letter in the character selection array 332. These operations scroll the list box 334, which in this variation displays names for assets 22. Alternately, the customer 40 can directly scroll the list box 334. By appropriate choice, perhaps as a setup option, selection of a particular entry in the list box 334 cause an associated asset 22 to be added to the shopping cart 166, or this can take the customer 40 to the asset view 260, with the selected asset 22 there displayed.

If the customer 40 selects the provider control 324 the search view 320 changes to the variation shown in FIG. 10*b*. Again letters can be entered in the text entry box 330 or mouse clicking may be used to select a first letter in the character selection array 332 to scroll the list box 334 (the case depicted in FIG. 10*b*), but now provider names are instead displayed for assets 22 in both the inventory 18 (the names as recorded in the asset data 186) and also the master inventory 104.

FIG. 10*c* shows how selection of a particular provider name in the list box 334 can then cause further display of a sub-list 336 to show assets 22 available from the selected provider. Highlighting, underlining (used in FIG. 10*c*), or some other convention may be used to distinguish which assets 22 are present locally in the inventory 18, and which are in the master inventory 104. As discussed for FIG. 10*a*, above, selection of a particular asset entry can be configured to take the user to the asset view 260 or add the selection to the shopping cart 166.

If the customer 40 selects the category control 326 the search view 320 changes to the variation shown in FIG. 10*d*. Again letters can be entered in the text entry box 330 or mouse clicking may select a letter in the character selection array 332 (the case depicted in FIG. 10*d*) to scroll the list box 334, but now it instead displays categories of assets 22 in both the inventory 18 and also the master inventory 104. Selection of a particular entry in the list box 334 presents the sub-list 336, only now containing assets by category, and moving to the asset view 260 or addition to the shopping cart 166 can proceed.

In keeping with the village 46 analogy, a map variation of the search view 320 may also be invoked, by selecting the map control 328. This variation is depicted in FIG. 10*e*, which has the text entry box 330, the character selection array 332, and the list box 334 all replaced with a map sub-view 338. The map sub-view 338 presents a graphic somewhat resembling a conventional map, but since geographic location need not be represented, what is instead displayed are general categories presented as regions encompassing related sub-categories. Here selecting a category or subcategory takes the customer 40 to an appropriate other view.

In the preferred embodiment, the DCVM 10 is a hybrid application that combines web content (HTML, Java, Shockwave, chat streams, etc.) and traditional C++ programming to create a dynamic and engaging shopping environment in the setting of the stores 44 throughout the village 46. The DCVM 10 may employ features such as digital certificates, Active Movie and a content advisor system. The invention is also scalable, making it able to work in most current PC 14 environments. The inventor's preferred base hardware platform is a 90 MHz Pentium microprocessor with 16 MB of RAM, 50 MB of free hard drive space, video capability of 800×600 SVGA and 1 MB VRAM, a 16 bit sound system, a 4× CD-ROM drive, the client OS 76 previously described, an analog or ISDN telephone connection (or Ethernet network connection to a system having one of these), and Internet access software. Access to the Internet 122 is desirable, but optional. In addition to the above mentioned examples, various other modifications and alterations of the inventive DCVM 10 may be made without departing from the invention.

Figure 11:
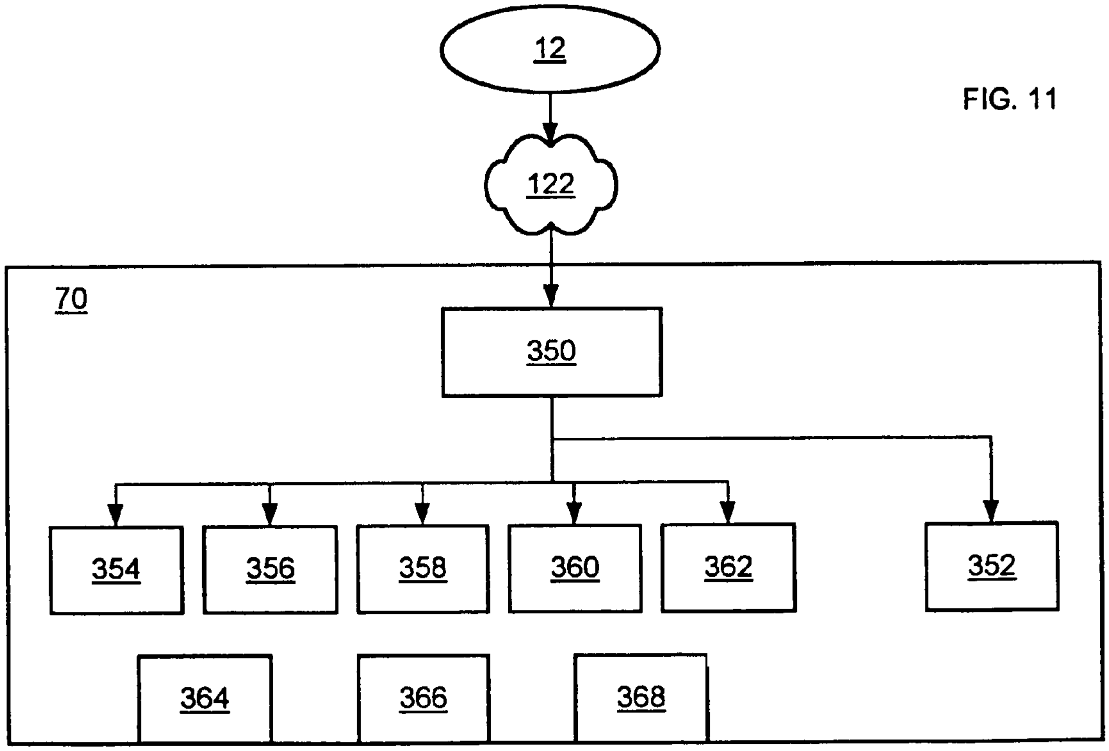
FIG. 11 is a block diagram depicting a hierarchical overview of an implementation of a master server application using access via the Internet.

Up to this point discussion has primarily been of the client 12. This has been because the master application 70 may be substantially implemented using conventional client-server and hypertext markup-up language (HTML) techniques. For example, FIG. 11 is a hierarchical overview of an implementation of the master application 70 of the inventive DCVM 10, using access via the Internet 122. The client 12 accesses the master application 70 by connection to a hypothetical site at www.master.com ("master" is used here as a hypothetical site domain name). At an HTML home page 350, registered and non-registered clients 12 can enter here, as well as those accessing entirely other features 352 (although registered clients 12 will more typically go directly to desired lower level services). Alternately, accessing www.master.com/view invokes a browse module 354, so that the customer 40 using a registered client 12 can view extra assets 22 not in the inventory 18 of the client 12; accessing www.master.com/buy invokes a purchase module 356, for customers 40 to directly purchase such non-local assets 22 and/or hard goods 140 from out of the master inventory 104; accessing www.master.com/update invokes an update module 358, to update the inventory 18 in the client 12; www.master.com/comm invokes an issue service module 360, for support for issue resolution and access to frequently asked question (FAQ) lists; and www.master.com/fix invokes a technical update module 362, to obtain bug fixes and updates of the infrastructure 16 in the client 12. Finally, also shown in FIG. 11 are a customer database 364, a log file 366, and a report generator 368, all of which may also be largely conventional in nature.

INDUSTRIAL APPLICABILITY

The present DCVM 10 is well suited for customers 40 with personal computers (PC's 14) to shop at the stores 44 in the village 46. The customers 40 can browse for "best of class" software, learn new computer skills, and obtain the latest news or other information on topics of interest. It is anticipated that these digital content assets 22 will initially primarily be software and computer related services, but the underlying concept here easily extends to include music and video content, as consumers of such increasingly gain computer sophistication. For example, the stores 44 may provide top software titles (say the top 200, as determined by best seller lists), with some stores 44 specializing in children's interests, others in adult's interests, others in business interests, etc. Since top-selling (i.e., high desirability) assets 22 may be made available in the stores 44 virtually immediately, they are available at precisely the times that the customers 40 are most likely to buy—right after they purchase a PC 14, or later as impulse or need directs. There is no driving to a store 44; the stores 44 are open twenty-four hours a day, seven days a week, 365 days a year. Shopping in the stores 44 is friendly and hassle free (e.g., there is no sales pressure); and delivery of assets 22 from the local inventory 18 is virtually instantaneous, is guaranteed, and is free. In sum, the customers 40 may receive superior service, gain confidence in, and have access to what they want (which as described below, can be pre-loaded, and even default configured, i.e., virtually assuring that it will work).

The present DCVM 10 is similarly well suited for the vendors 42. Traditional vendors 42 can easily set up stores 44 the village 46 and concentrate on their product or service sales missions, leaving system management to the provider of the master server 48 and financial matters to the clearing house 50. Further, in the DCVM 10 the stores 44 can have potentially huge customer 40 traffic yet have very low operating cost. Thus, many additional and diverse potential vendors 42 may chose to operate stores 44 in the village 46.

The vendors 42 can also provide communications with shopkeepers, customer support, and technical support personnel in the stores 44. The DCVM 10 particularly lends itself to various marketing incentives for original equipment manufactures (OEM's) of PC's 14. The system builders of PC's 14 can set up their own outlets and customer service centers (i.e., become vendors 42) in the village 46 shipped with the PC's 14 which they supply. They can also use the inherent push technology of the Internet 122 to keep these current and to promote special offers, upgrades, rebates, or software service programs. Securing a spot in the village 46 enables system builders to establish and maintain a channel of communications between themselves and their individual customers 40. Thus suppliers can easily enter the software business profitably and create an annuity stream that can continue for years. To "boot strap" the customers 40 into this new manner of commerce, one store 44 can even sell Internet subscription and setup.

The present DCVM 10 is similarly well suited for maintaining the traditional roles of the financial and governmental sectors, which are major concerns today in Internet based commerce. All transactions can be screened for fraud by the clearing houses 50, which may be operated by leading members of the financial industry. To ease commerce via licensing and to minimize disputes, or easily resolve those that do occur, the DCVM 10 may conform to the buying and license management schemes as defined by the Software Publisher's Association, thus assuring compliance with industry standards for credit card and intellectual proprietary protection. Finally, to facilitate governmental regulatory and taxation roles, the master server 48 and the clearing house 50 are highly audit able.

The key to the inventive DCVM 10 being able to function as described above is that it is stored in the PC 14 of the customer 40, thus bringing a plethora of digital content deliverable goods and services from a wide variety of vendors 42 directly to the customer 40. Accordingly, wide and rapid acceptance of the DCVM 10 can be expected.

In addition to the above mentioned examples, various other modifications and alterations of the inventive DCVM 10 may be made without departing from the invention. Accordingly, the above disclosure is not to be considered as limiting and the appended claims are to be interpreted as encompassing the true spirit and the entire scope of the invention.

What is claimed is:

1. A method for marketing digital content, comprising:

a) storing an inventory of assets in a hard drive of a personal computer prior to delivery of said personal computer to a user, wherein said assets are instances of the digital content and are protected from unauthorized use by a digital wrapper requiring at least one key for unwrapping;

b) subsequent to said delivery of said personal computer to said user, displaying on the personal computer information about said inventory;

c) accepting a selection representing a particular said asset from said user;

d) transmitting money representing payment for said selection and an identifier associated with said selection from the personal computer to a clearing house, via a communications system;

e) receiving at the personal computer a first key, associated with said selection, from said clearing house;

f) transmitting from the personal computer the received first key to a master server, via said communications system;

g) receiving back at the personal computer a second key from said master server; and h) unwrapping said digital wrapper protecting said selection using the received second key required for unwrapping said selection.

2. The method claim 1, wherein said (b) through said (f) are performed using a graphical user interface that presents said assets metaphorically as merchandise and units of service in aisles of stores.

3. The method of claim 1, wherein said graphical user interface further presents said stores metaphorically as a member of the set consisting of villages, town squares, shopping centers, and malls.

* * * * *